(12) United States Patent
Itoh et al.

(10) Patent No.: US 9,562,473 B2
(45) Date of Patent: Feb. 7, 2017

(54) GAS TURBINE FACILITY

(71) Applicant: 8 RIVERS CAPITAL, LLC, Durham, NC (US)

(72) Inventors: Masao Itoh, Yokohama (JP); Nobuhiro Okizono, Yokohama (JP); Hideyuki Maeda, Yokohama (JP); Yasunori Iwai, Yokohama (JP); Jeremy Eron Fetvedt, Raleigh, NC (US); Rodney John Allam, Wiltshire (GB)

(73) Assignee: 8 RIVERS CAPITAL, LLC, Durham, NC (US)

( * ) Notice: Subject to any disclaimer, the term of this patent is extended or adjusted under 35 U.S.C. 154(b) by 343 days.

(21) Appl. No.: 14/456,233

(22) Filed: Aug. 11, 2014

(65) Prior Publication Data

US 2015/0059313 A1 Mar. 5, 2015

(30) Foreign Application Priority Data

Aug. 27, 2013 (JP) .................................. 2013-175933

(51) Int. Cl.
*F01K 19/10* (2006.01)
*F02C 6/18* (2006.01)
(Continued)

(52) U.S. Cl.
CPC . *F02C 3/34* (2013.01); *F02C 1/08* (2013.01); *F02C 6/18* (2013.01); *F01K 19/10* (2013.01); *Y02E 20/16* (2013.01); *Y02E 20/322* (2013.01)

(58) Field of Classification Search
CPC .......... Y02E 20/322; F01K 19/10; F02C 6/18; F02C 1/08; F02C 3/34
See application file for complete search history.

(56) References Cited

U.S. PATENT DOCUMENTS

| 3,369,361 A | 2/1968 | Craig |
| 3,376,706 A | 4/1968 | Angelino |

(Continued)

FOREIGN PATENT DOCUMENTS

| CN | 1898499 | 1/2007 |
| CN | 101201171 | 6/2008 |

(Continued)

OTHER PUBLICATIONS

R.J. Allam, et al., "High efficiency and low cost of electricity generation from fossil fuels while eliminating atmospheric emissions, including carbon dioxide", GHGT-11, Energy Procedia 00, 2012, 12 pages.

(Continued)

*Primary Examiner* — Phutthiwat Wongwian
*Assistant Examiner* — William Breazeal
(74) *Attorney, Agent, or Firm* — Womble Carlyle Sandridge & Rice, LLP

(57) ABSTRACT

The gas turbine facility 10 of the embodiment includes a combustor 20 combusting fuel and oxidant, a turbine 21 rotated by combustion gas, a heat exchanger 23 cooling the combustion gas, a heat exchanger 24 removing water vapor from the combustion gas which passed through the heat exchanger 23 to regenerate dry working gas, and a compressor 25 compressing the dry working gas until it becomes supercritical fluid. Further, the gas turbine facility 10 includes a pipe 42 guiding a part of the dry working gas from the compressor 25 to the combustor 20 via the heat exchanger 23, a pipe 44 exhausting a part of the dry working gas to the outside, and a pipe 45 introducing a remaining part of the dry working gas exhausted from the compressor 25 into a pipe 40 coupling an outlet of the turbine 21 and an inlet of the heat exchanger 23.

8 Claims, 3 Drawing Sheets

(51) Int. Cl.
  *F02C 1/08* (2006.01)
  *F02C 3/34* (2006.01)

(56) References Cited

U.S. PATENT DOCUMENTS

| | | |
|---|---|---|
| 3,503,208 A | 3/1970 | Schmidt |
| 3,544,291 A | 12/1970 | Schlinger et al. |
| 3,736,745 A | 6/1973 | Karig |
| 3,837,788 A | 9/1974 | Craig et al. |
| 3,868,817 A | 3/1975 | Marion et al. |
| 3,971,211 A | 7/1976 | Wethe et al. |
| 3,976,443 A | 8/1976 | Paull et al. |
| 4,132,065 A | 1/1979 | McGann |
| 4,154,581 A | 5/1979 | Nack et al. |
| 4,191,500 A | 3/1980 | Oberg et al. |
| 4,193,259 A | 3/1980 | Muenger et al. |
| 4,206,610 A | 6/1980 | Santhanam |
| 4,434,613 A | 3/1984 | Stahl |
| 4,498,289 A | 2/1985 | Osgerby |
| 4,522,628 A | 6/1985 | Savins |
| 4,602,483 A | 7/1986 | Wilks et al. |
| 4,702,747 A | 10/1987 | Meyer et al. |
| 4,721,420 A | 1/1988 | Santhanam et al. |
| 4,765,143 A | 8/1988 | Crawford et al. |
| 4,765,781 A | 8/1988 | Wilks et al. |
| 4,839,030 A | 6/1989 | Comolli et al. |
| 4,852,996 A | 8/1989 | Knop et al. |
| 4,881,366 A | 11/1989 | Nurse |
| 4,957,515 A | 9/1990 | Hegarty |
| 4,999,992 A | 3/1991 | Nurse |
| 4,999,995 A | 3/1991 | Nurse |
| 5,175,995 A | 1/1993 | Pak et al. |
| 5,247,791 A | 9/1993 | Pak et al. |
| 5,265,410 A | 11/1993 | Hisatome |
| 5,345,756 A | 9/1994 | Jahnke et al. |
| 5,353,721 A | 10/1994 | Mansour et al. |
| 5,394,686 A | 3/1995 | Child et al. |
| 5,415,673 A | 5/1995 | Hilton et al. |
| 5,421,166 A | 6/1995 | Allam et al. |
| 5,507,141 A | 4/1996 | Stigsson |
| 5,520,894 A | 5/1996 | Heesink et al. |
| 5,590,519 A | 1/1997 | Almlöf et al. |
| 5,595,059 A | 1/1997 | Huber et al. |
| 5,692,890 A | 12/1997 | Graville |
| 5,709,077 A | 1/1998 | Beichel |
| 5,715,673 A | 2/1998 | Beichel |
| 5,724,805 A | 3/1998 | Golomb et al. |
| 5,775,091 A * | 7/1998 | Bannister ........... F01D 5/084 60/39.17 |
| 5,802,840 A | 9/1998 | Wolf |
| 5,906,806 A | 5/1999 | Clark |
| 5,937,652 A | 8/1999 | Abdelmalek |
| 6,024,029 A | 2/2000 | Clark |
| 6,148,602 A | 11/2000 | Demetri |
| 6,170,264 B1 | 1/2001 | Viteri et al. |
| 6,196,000 B1 | 3/2001 | Fassbender |
| 6,199,364 B1 | 3/2001 | Kendall et al. |
| 6,202,574 B1 | 3/2001 | Liljedahl et al. |
| 6,209,307 B1 | 4/2001 | Hartman |
| 6,212,871 B1 * | 4/2001 | Rakhmailov ........... F02C 3/067 60/39.12 |
| 6,260,348 B1 | 7/2001 | Sugishita et al. |
| 6,263,661 B1 | 7/2001 | Van der Burgt et al. |
| 6,269,624 B1 * | 8/2001 | Frutschi ............... F01K 21/047 60/39.52 |
| 6,289,666 B1 | 9/2001 | Ginter |
| 6,298,664 B1 | 10/2001 | Åsen et al. |
| 6,333,015 B1 | 12/2001 | Lewis |
| 6,389,814 B2 | 5/2002 | Viteri et al. |
| 6,430,916 B2 | 8/2002 | Sugishita et al. |
| 6,532,745 B1 | 3/2003 | Neary |
| 6,536,205 B2 | 3/2003 | Sugishita et al. |
| 6,543,214 B2 | 4/2003 | Sasaki et al. |
| 6,550,234 B2 | 4/2003 | Guillard |
| 6,598,398 B2 | 7/2003 | Viteri et al. |
| 6,612,113 B2 | 9/2003 | Guillard |
| 6,622,470 B2 | 9/2003 | Viteri et al. |
| 6,629,414 B2 | 10/2003 | Fischer |
| 6,637,183 B2 | 10/2003 | Viteri et al. |
| 6,684,643 B2 | 2/2004 | Frutschi |
| 6,764,530 B2 | 7/2004 | Iijima |
| 6,775,987 B2 | 8/2004 | Sprouse et al. |
| 6,802,178 B2 | 10/2004 | Sprouse et al. |
| 6,820,689 B2 | 11/2004 | Sarada |
| 6,824,710 B2 | 11/2004 | Viteri et al. |
| 6,871,502 B2 | 3/2005 | Marin et al. |
| 6,877,319 B2 | 4/2005 | Linder et al. |
| 6,877,322 B2 | 4/2005 | Fan |
| 6,898,936 B1 | 5/2005 | Ochs et al. |
| 6,910,335 B2 | 6/2005 | Viteri et al. |
| 6,918,253 B2 | 7/2005 | Fassbender |
| 6,945,029 B2 | 9/2005 | Viteri |
| 6,945,052 B2 | 9/2005 | Frutschi et al. |
| 6,993,912 B2 | 2/2006 | Fischer |
| 7,007,474 B1 | 3/2006 | Ochs et al. |
| 7,007,486 B2 | 3/2006 | Sprouse et al. |
| 7,021,063 B2 | 4/2006 | Viteri |
| 7,022,168 B2 | 4/2006 | Schimkat et al. |
| 7,043,920 B2 | 5/2006 | Viteri et al. |
| 7,074,033 B2 | 7/2006 | Neary |
| 7,089,743 B2 | 8/2006 | Frutschi et al. |
| 7,111,463 B2 | 9/2006 | Sprouse et al. |
| 7,124,589 B2 | 10/2006 | Neary |
| 7,147,461 B2 | 12/2006 | Neary |
| 7,191,587 B2 | 3/2007 | Marin et al. |
| 7,192,569 B2 | 3/2007 | Stewart |
| 7,281,590 B2 | 10/2007 | Van de Waal |
| 7,284,362 B2 | 10/2007 | Marin et al. |
| 7,299,637 B2 | 11/2007 | Becker |
| 7,303,597 B2 | 12/2007 | Sprouse et al. |
| 7,328,581 B2 | 2/2008 | Christensen et al. |
| 7,334,631 B2 | 2/2008 | Kato et al. |
| 7,360,639 B2 | 4/2008 | Sprouse et al. |
| 7,363,764 B2 | 4/2008 | Griffin et al. |
| 7,377,111 B2 | 5/2008 | Agnew |
| 7,387,197 B2 | 6/2008 | Sprouse et al. |
| 7,402,188 B2 | 7/2008 | Sprouse |
| 7,469,544 B2 | 12/2008 | Farhangi |
| 7,469,781 B2 | 12/2008 | Chataing et al. |
| 7,503,178 B2 | 3/2009 | Bücker et al. |
| 7,516,607 B2 | 4/2009 | Farhangi et al. |
| 7,516,609 B2 | 4/2009 | Agnew |
| 7,547,419 B2 | 6/2009 | Sprouse et al. |
| 7,547,423 B2 | 6/2009 | Sprouse et al. |
| 7,553,463 B2 | 6/2009 | Zauderer |
| 7,615,198 B2 | 11/2009 | Sprouse et al. |
| 7,665,291 B2 | 2/2010 | Anand et al. |
| 7,717,046 B2 | 5/2010 | Sprouse et al. |
| 7,722,690 B2 | 5/2010 | Shires et al. |
| 7,731,783 B2 | 6/2010 | Sprouse et al. |
| 7,739,874 B2 | 6/2010 | Nigro |
| 7,740,671 B2 | 6/2010 | Yows et al. |
| 7,740,672 B2 | 6/2010 | Sprouse |
| 7,814,975 B2 | 10/2010 | Hagen et al. |
| 7,826,054 B2 | 11/2010 | Zillmer et al. |
| 7,827,794 B1 | 11/2010 | Pronske et al. |
| 7,874,140 B2 | 1/2011 | Fan et al. |
| 7,882,692 B2 | 2/2011 | Pronske et al. |
| 7,927,574 B2 | 4/2011 | Stewart |
| 7,934,383 B2 | 5/2011 | Gutierrez et al. |
| 7,950,243 B2 | 5/2011 | Gurin |
| 7,966,829 B2 | 6/2011 | Finkenrath et al. |
| 8,043,588 B2 | 10/2011 | Hustad et al. |
| 8,088,196 B2 | 1/2012 | White et al. |
| 8,109,095 B2 | 2/2012 | Henriksen et al. |
| 8,220,248 B2 | 7/2012 | Wijmans et al. |
| 8,596,075 B2 | 12/2013 | Allan et al. |
| 8,776,532 B2 | 7/2014 | Allam et al. |
| 8,850,789 B2 | 10/2014 | Evulet et al. |
| 8,959,887 B2 | 2/2015 | Allam et al. |
| 8,986,002 B2 | 3/2015 | Palmer et al. |
| 9,068,743 B2 | 6/2015 | Palmer et al. |
| 2002/0134085 A1 | 9/2002 | Frutschi |
| 2003/0131582 A1 | 7/2003 | Anderson et al. |

(56) References Cited

U.S. PATENT DOCUMENTS

| | | |
|---|---|---|
| 2003/0221409 A1 | 12/2003 | McGowan |
| 2004/0011057 A1 | 1/2004 | Huber |
| 2004/0123601 A1 | 7/2004 | Fan |
| 2004/0134197 A1 | 7/2004 | Marin et al. |
| 2005/0126156 A1 | 6/2005 | Anderson et al. |
| 2006/0242907 A1 | 11/2006 | Sprouse et al. |
| 2007/0180768 A1 | 8/2007 | Briesch et al. |
| 2007/0274876 A1 | 11/2007 | Chiu et al. |
| 2008/0010967 A1 | 1/2008 | Griffin et al. |
| 2008/0104958 A1 | 5/2008 | Finkenrath et al. |
| 2008/0115500 A1 | 5/2008 | MacAdam et al. |
| 2008/0166672 A1 | 7/2008 | Schlote et al. |
| 2008/0187877 A1 | 8/2008 | Fitzsimmons et al. |
| 2008/0190214 A1 | 8/2008 | Ubowski et al. |
| 2008/0309087 A1 | 12/2008 | Evulet et al. |
| 2009/0025390 A1 | 1/2009 | Christensen et al. |
| 2009/0061264 A1 | 3/2009 | Agnew |
| 2009/0130660 A1 | 5/2009 | Faham et al. |
| 2009/0229271 A1 | 9/2009 | Ruyck et al. |
| 2009/0260585 A1 | 10/2009 | Hack et al. |
| 2009/0301054 A1 | 12/2009 | Simpson et al. |
| 2010/0018218 A1 | 1/2010 | Riley et al. |
| 2010/0024378 A1 | 2/2010 | Ackermann et al. |
| 2010/0024381 A1 | 2/2010 | Ackermann et al. |
| 2010/0024433 A1 | 2/2010 | Ackermann et al. |
| 2010/0031668 A1 | 2/2010 | Kepplinger |
| 2010/0077752 A1 | 4/2010 | Papile |
| 2010/0288172 A1 | 11/2010 | Jukkola et al. |
| 2010/0300063 A1 | 12/2010 | Palmer et al. |
| 2010/0326084 A1 | 12/2010 | Anderson et al. |
| 2011/0036011 A1 | 2/2011 | Sprouse et al. |
| 2011/0127773 A1 | 6/2011 | Freund et al. |
| 2011/0179799 A1* | 7/2011 | Allam ............... F23M 5/085 60/772 |
| 2011/0185701 A1 | 8/2011 | Koda et al. |
| 2011/0233940 A1 | 9/2011 | Aoyama et al. |
| 2011/0239651 A1 | 10/2011 | Aoyama et al. |
| 2012/0067054 A1* | 3/2012 | Palmer ............... F01D 5/085 60/772 |
| 2012/0067056 A1 | 3/2012 | Palmer et al. |
| 2012/0073261 A1 | 3/2012 | Palmer et al. |
| 2012/0237881 A1 | 9/2012 | Allam et al. |
| 2013/0104525 A1* | 5/2013 | Allam ............... F25J 3/04018 60/273 |
| 2013/0118145 A1* | 5/2013 | Palmer ............... F02C 1/06 60/39.52 |
| 2013/0199195 A1 | 8/2013 | Allam et al. |
| 2013/0205746 A1 | 8/2013 | Allam et al. |
| 2013/0213049 A1 | 8/2013 | Allam et al. |
| 2014/0000271 A1 | 1/2014 | Mittricker et al. |
| 2014/0053529 A1 | 2/2014 | Allam et al. |
| 2014/0230401 A1* | 8/2014 | Dunn ............... F02C 3/34 60/39.52 |
| 2014/0331687 A1 | 11/2014 | Palmer et al. |

FOREIGN PATENT DOCUMENTS

| | | |
|---|---|---|
| CN | 101324203 | 12/2008 |
| CN | 102834670 | 12/2012 |
| CN | 103221640 | 7/2013 |
| JP | 2225905 | 9/1990 |
| JP | 6-26362 | 2/1994 |
| JP | 3110114 | 11/2000 |
| JP | 2000-337107 | 12/2000 |
| JP | 2001-132472 | 5/2001 |
| JP | 2001159317 A | 6/2001 |
| JP | 3454372 | 10/2003 |
| JP | 2011052620 A | 3/2011 |
| JP | 2012097742 A | 5/2012 |
| WO | WO 95/12757 | 5/1995 |
| WO | WO 2009/041617 | 4/2009 |
| WO | WO 2012/003079 | 1/2012 |

OTHER PUBLICATIONS

Extended European Search Report issued Feb. 26, 2015 in Patent Application No. 14181143.0.

Allam et al., "High Efficiency and Low Cost of Electricity Generation from Fossil Fuels While Eliminating Atmospheric Emissions, Including Carbon Dioxide," GHGT-11, *Energy Procedia* 00, 2012, pp. 1-12.

Combs, Jr. "An Investigation of the Supercritical CO2 Cycle (Feher Cycle) for Shipboard Application," 1977, *Submitted in Partial Fulfillment of the Requirements for the Degree of Ocean Engineer and the Degree of Master of Science in Mechanical Engineering at the Massachusetts Institute of Technology*, 148.

Dostal et al., "A Supercritical Carbon Dioxide Cycle for Next Generation Nuclear Reactors," 2004, (*Research Paper*) *Advanced Nuclear Power Technology Program at MIT*, 326 pages.

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

Iantovski et al., "Highly Efficient Zero Emission CO2-Based Power Plant" *Energy Convers. Mgmt*, 1997, Suppl. pp. S141-S146, vol. 38.

Mathieu et al., "Sensitivity Analysis of the MATIANT Cycle", *Energy Conversion & Management*, 1999, pp. 1687-1700, vol. 40.

Wall et al., "A Zero Emission Combustion Power Plant for Enhanced Oil Recovery," *Energy*, 1995, pp. 823-828, vol. 20, No. 8.

Yantovskii et al. , "Computer Exergonomics of Power Plants Without Exhaust Gases," Energy Convers. Mgmt., Publ. 1992, vol. 33, No. 5-8, pp. 405-412.

http://www.graz-cycle.tugraz.at/pdfs/Bolland_Kvamsdal_Boden_Liege.pdf; BOLAND, "A Thermodynamic Comparison of the Oxy-Fuel Power Cycles Water-Cycle, Graz-Cycle and Matiant-Cycle," *Norwegian University of Science and Technology*, Trondheim, Norway.

http://www2.ulg.ac.be/genieune/pageco2.htm; Université de Liège, Department of Power Generation, "CO2 Researches".

* cited by examiner

GAS TURBINE FACILITY

CROSS-REFERENCE TO RELATED APPLICATION

This application is based upon and claims the benefit of priority from Japanese Patent Application No. 2013-175933, filed on Aug. 27, 2013; the entire contents of which are incorporated herein by reference.

FIELD

Embodiments described herein relate generally to a gas turbine facility.

BACKGROUND

Increasing efficiency of power generation plants is in progress in response to demands for reduction of carbon dioxide, resource conservation, and the like. Specifically, increasing temperature of working fluid of a gas turbine and a steam turbine, employing a combined cycle, and the like are actively in progress. Further, research and development of collection techniques of carbon dioxide are in progress.

FIG. 3 is a system diagram of a conventional gas turbine facility in which a part of carbon dioxide generated in a combustor is circulated as working fluid. As illustrated in FIG. 3, oxygen separated from an air separator (not illustrated) is regulated in flow rate by a flow rate regulating valve 310 and is supplied to a combustor 311. Fuel is regulated in flow rate by a flow rate regulating valve 312 and is supplied to the combustor 311. This fuel is, for example, hydrocarbon.

The fuel and oxygen react (combust) in the combustor 311. When the fuel combusts with oxygen, carbon dioxide and water vapor are generated as combustion gas. The flow rates of fuel and oxygen are regulated to be of a stoichiometric mixture ratio in a state that they are completely mixed.

The combustion gas generated in the combustor 311 is introduced into a turbine 313. The combustion gas which performed an expansion work in the turbine 313 passes through a heat exchanger 314 and then further through a heat exchanger 315. When passing through the heat exchanger 315, the water vapor condenses into water. The water passes through a pipe 316 and is discharged to the outside. Note that a generator 317 is coupled to the turbine 313.

Dry working gas (carbon dioxide) separated from water vapor is compressed by a compressor 318. A part of the compressed carbon dioxide is regulated in flow rate by a flow rate regulating valve 319 and is exhausted to the outside. The rest of the carbon dioxide is heated in the heat exchanger 314 and is supplied to the combustor 311.

Here, in the gas turbine facility, turbine load control is performed from a full speed no load (FSNL) to a rated value. Thus, the flow rate of working fluid introduced into the turbine 313 varies. The pressure of the working fluid in this gas turbine facility is at high pressure, and thus the volumetric flow rate of the working fluid in the compressor 318 is small. Accordingly, as the compressor 318, an axial compressor is not suitable, and a centrifugal compressor is used.

A part of the carbon dioxide supplied to the combustor 311 is introduced into a combustion zone together with the fuel and oxygen. The rest of the carbon dioxide is used to cool wall surfaces of the combustor 311 and dilute the combustion gas. Then, the carbon dioxide introduced into the combustor 311 is introduced into the turbine 313 together with the combustion gas.

In the above-described system, an amount of carbon dioxide equivalent to the amount of carbon dioxide generated by combusting fuel and oxygen in the combustor 311 is exhausted to the outside of the system. The carbon dioxide exhausted to the outside of the system is collected by, for example, a recovery apparatus. Further, for example, it is also possible to utilize the exhausted carbon dioxide for pushing out residual oil from an underground rock formation of an oil field. On the other hand, the carbon dioxide left in the system circulates through the system.

In the above-described conventional gas turbine facility, flame formed in the combustor 311 is affected by, for example, a jetting velocity of carbon dioxide jetted into the combustor 311 (hereinafter referred to as a combustor jetting velocity V).

This combustor jetting velocity V is defined by following equation (1).

$$V = G \times T \times R \times Z / (P \times A) \qquad (1)$$

Here, G is a volumetric flow rate of carbon dioxide flowing into the combustor 311, T is a temperature of carbon dioxide flowing into the combustor 311, R is a gas constant, and Z is a coefficient of compressibility. Further, P is a pressure of carbon dioxide flowing into the combustor 311, and A is a total opening area of an opening passed through by carbon dioxide which flowed into the combustor 311.

As described above, the flame is affected by the combustor jetting velocity V. Accordingly, when the turbine load control is performed in the gas turbine facility, for example, it is preferred to control this combustor jetting velocity V in an appropriate range so as to achieve stabilization of the flame.

However, in the centrifugal compressor used as the above-described compressor 318, for example, inlet guide vanes similar to that in the axial compressor is not provided, and thus it is difficult to perform flow rate control in a wide range. Accordingly, when the turbine load changes, it is difficult to control the combustor jetting velocity V in an appropriate range.

DETAILED DESCRIPTION

In one embodiment, a gas turbine facility includes a combustor combusting fuel and oxidant, a turbine rotated by combustion gas exhausted from the combustor, a heat exchanger cooling the combustion gas exhausted from the turbine, and a water vapor remover removing water vapor from the combustion gas which passed through the heat exchanger to regenerate dry working gas therefrom.

Moreover, the gas turbine facility has a compressor compressing the dry working gas until it becomes supercritical fluid, a combustor introduction pipe guiding a part of the dry working gas of supercritical fluid exhausted from the compressor to the combustor via the heat exchanger, an exhaust pipe branched from the combustor introduction pipe on an upstream side of the heat exchanger to exhaust a part of the dry working gas flowing through the combustor introduction pipe to the outside, and a bypass pipe introducing a remaining part of the dry working gas of supercritical fluid exhausted from the compressor into a pipe coupling an outlet of the turbine and an inlet of the heat exchanger.

Hereinafter, embodiments will be described with reference to drawings.

Figure 1:
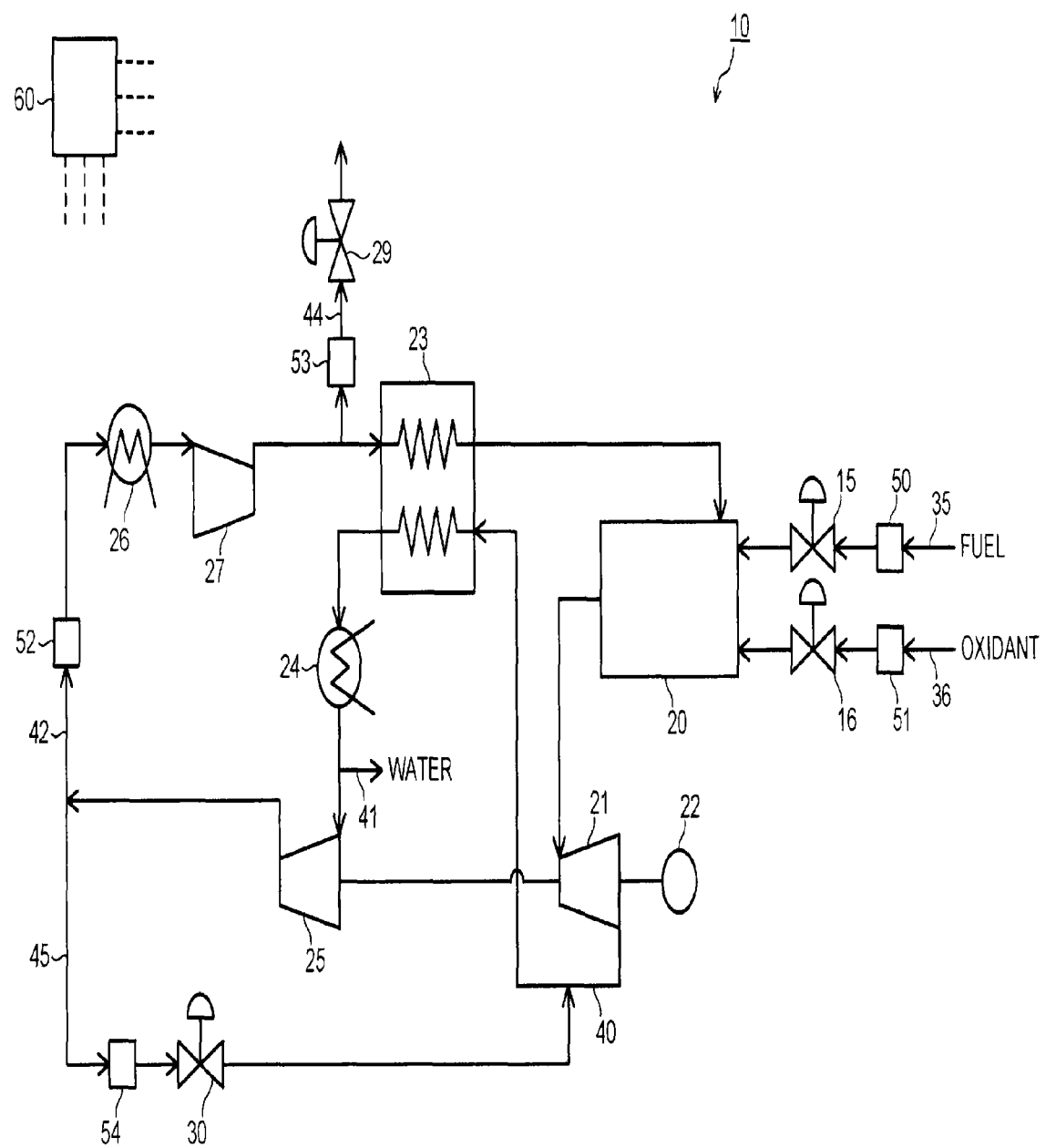
FIG. 1 is a system diagram of a gas turbine facility of an embodiment.

FIG. 1 is a system diagram of a gas turbine facility 10 of an embodiment. As illustrated in FIG. 1, the gas turbine facility 10 has a combustor 20 combusting fuel and oxidant. A pipe 35 supplying fuel to the combustor 20 is provided with a flow rate regulating valve 15 for regulating a flow rate of fuel. A pipe 36 supplying oxidant to the combustor 20 is provided with a flow rate regulating valve 16 for regulating a flow rate of oxidant. Note that the flow rate regulating valve 16 functions as an oxidant flow rate regulating valve.

Here, as the fuel, for example, hydrocarbon such as natural gas or methane, or coal gasification gas can also be used. As the oxidant, oxygen is used. This oxygen is obtained by, for example, separating from the atmosphere by an air separating apparatus (not illustrated).

The combustion gas exhausted from the combustor 20 is guided to a turbine 21. This turbine 21 is rotated by combustion gas. For example, a generator 22 is coupled to this turbine 21. Note that the combustion gas exhausted from the combustor 20 mentioned here contains combustion product, generated by combustion of fuel and oxidant, and dry working gas (carbon dioxide), which will be described later, supplied to the combustor 20 and exhausted together with the combustion product from the combustor 20.

The combustion gas exhausted from the turbine 21 is cooled by passing through a heat exchanger 23 interposed in a pipe 40. The combustion gas which passed through the heat exchanger 23 further passes through a heat exchanger 24 interposed in the pipe 40. By passing through the heat exchanger 24, water vapor contained in the combustion gas is removed, and dry working gas is regenerated from the combustion gas. Here, by passing through the heat exchanger 24, the water vapor condenses into water. This water passes through a pipe 41 for example and is discharged to the outside. Note that the heat exchanger 24 functions as a water vapor remover removing water vapor.

It is preferred that no excess oxidant (oxygen) or fuel remain in the combustion gas exhausted from the combustor 20. Accordingly, the flow rates of fuel and oxygen supplied to the combustor 20 are regulated to be of a stoichiometric mixture ratio (equivalence ratio). Thus, the components of the dry working gas are mostly carbon dioxide. Note that the dry working gas also includes the case where, for example, a minute amount of carbon monoxide or the like is mixed in.

The dry working gas is guided to a compressor 25 by the pipe 40. The dry working gas is compressed by the compressor 25 until it becomes supercritical fluid. At an outlet of the compressor 25, pressure of the dry working gas is, for example, 8 MPa to 9 MPa, and temperature of the dry working gas is, for example, 35 to 45° C. Note that the supercritical fluid refers to a state under a temperature and a pressure equal to or higher than a critical point.

Here, as the compressor 25, for example, a centrifugal compressor is used. The compressor 25 is, for example, coupled coaxially to the turbine 21 so as to prevent overspeeding of the turbine 21. In this case, the compressor 25 rotates constantly at a rated rotation speed of the turbine 21 when the turbine 21 is at a rated value. The centrifugal compressor has a small surge margin with respect to increase in pressure ratio. Thus, when the rotation speed is constant, the centrifugal compressor is preferred to be operated with a volumetric flow rate and a pressure ratio which are constant.

Further, in order to keep the pressure at the outlet of the compressor 25 at a certain supercritical pressure for example, the pressure at an inlet of the compressor 25 is also at a constant value. When the pressure at the inlet of the compressor 25 is constant, the pressure at an outlet of the turbine 21 is constant. This is preferred also in view of sealing characteristics of the turbine 21 and stable use of the heat exchangers 23, 24. Note that in order to maintain the pressure at the outlet of the compressor 25 constant, it is necessary to regulate a flow rate of dry working gas flowing through a pipe 45, which will be described later.

A part of the dry working gas of supercritical fluid exhausted from the compressor 25 passes through a pipe 42 and is guided to the combustor 20. This pipe 42 functions as a combustor introduction pipe. In the pipe 42, a cooler 26 for cooling the dry working gas of supercritical fluid is interposed. The dry working gas of supercritical fluid maintains a pressure equal to or higher than the pressure of the critical point by passing through the cooler 26, and is at a temperature lower than the temperature of the critical point. Thus, after passing through the cooler 26, the dry working gas exits the state of supercritical fluid and becomes liquid.

In the pipe 42 on a downstream side of the cooler 26, a pump 27 pressurizing the dry working gas which became liquid is interposed. The pump 27 pressurizes, for example, the dry working gas which became liquid according to a turbine load. The pump 27 is controlled in rotation speed by an inverter motor for example. The dry working gas which became liquid is pressurized by the pump 27 and also its temperature becomes equal to or higher than the temperature of the critical point. Thus, the dry working gas which became liquid passes through the pump 27 to thereby become the dry working gas of supercritical fluid again.

In the pump 27, for example, in order to supply the dry working gas at a predetermined flow rate and pressure to the combustor 20, rotation speed control is carried out by, for example, an inverter so as to make it pass setting points of the predetermined flow rate and pressure.

Here, the reason for making the dry working gas which passed through the cooler 26 become liquid while keeping a pressure equal to or higher than the pressure of the critical point is, for example, to prevent damage due to cavitation occurring when a two-layer flow of gas-liquid mixture enters the pump 27 under the condition that gas and liquid can exist together, such as a condition equal to or lower than the critical point. Further, by making it become liquid, condensation heat is not deprived, allowing operation while maintaining cycle efficiency.

Further, by turbine load control, a flow rate of the dry working gas exhausted from the pump 27 and an outlet pressure of the pump 27 change widely. In the turbine 21, the combustion gas becomes a choked flow, and hence its swallowing capacity (SWC) becomes constant. Thus, the following equation (2) is satisfied.

$$SWC = G_t \times (T_t)^{1/2} / P_t = \text{constant} \qquad \text{equation (2)}$$

Here, $G_t$ is a volumetric flow rate of the combustion gas at an inlet of the turbine 21, $T_t$ is a temperature of the combustion gas at the inlet of the turbine 21, and $P_t$ is a pressure of the combustion gas at the inlet of the turbine 21.

For example, in order to increase the pressure of the combustion gas supplied to the turbine 21, if the flow rate of the combustion gas is determined, the fuel flow rate and the oxidant flow rate are increased to raise the temperature of the combustion gas. However, when the pump 27 is not provided, there is almost no surge input margin of the centrifugal compressor which is the compressor 25, and thus it cannot withstand the pressure increase thereof. Accordingly, by having the pump 27, a system which withstands the pressure increase is realized.

A pipe 44 exhausting a part of the dry working gas flowing through the pipe 42 to the outside is branched from the pipe 42 between the pump 27 and the heat exchanger 23. This pipe 44 functions as an exhaust pipe. The pipe 44 is provided with a flow rate regulating valve 29 for regulating the flow rate of the dry working gas to be exhausted. Note that the flow rate regulating valve 29 functions as an exhaust flow rate regulating valve.

The dry working gas exhausted from the pipe 44 is collected by, for example, a recovery apparatus. Further, for example, it is also possible to utilize the exhausted dry working gas to push out residual oil from an underground rock formation of an oil field. For example, an amount of carbon dioxide equivalent to the amount of carbon dioxide generated by combusting fuel and oxygen in the combustor 20 is exhausted from the pipe 44. Note that the dry working gas other than the dry working gas exhausted from the pipe 44 is guided to the combustor 20 and circulates through the system.

On the downstream of the branching part of the pipe 44, the pipe 42 passes through the heat exchanger 23 and communicates with the combustor 20. In the heat exchanger 23, the dry working gas of supercritical fluid flowing through the pipe 42 obtains a heat quantity from the combustion gas exhausted from the turbine 21 and is heated thereby. The dry working gas passing through the pipe 42 and being introduced into the combustor 20 is, for example, jetted into a combustion zone together with the fuel and oxidant from the upstream side of the combustor 20, or jetted into a downstream side of a combustion zone in a combustor liner from a dilution hole or the like after cooling the combustor liner.

Here, a jetting velocity to the combustor 20 of the dry working gas guided to the combustor 20 via the pipe 42 is preferred to be almost constant irrespective of the turbine load. The jetting velocity is the combustor jetting velocity V defined by the above-described equation (1). This combustor jetting velocity V is set so that a recirculation zone which contributes to flame stability is formed in an appropriate range of the combustion zone. The combustor jetting velocity V being almost constant refers to, for example, a range of ±10% with an average combustor jetting velocity in each turbine load as its center.

The total opening area A of the opening passed through by dry working gas (carbon dioxide) which flowed into the combustor 20 is constant. Accordingly, when the combustor jetting velocity V is set almost constant irrespective of the turbine load, the mass flow rate of the dry working gas supplied to the combustor changes by the turbine load, but the volumetric flow rate becomes almost constant irrespective of the turbine load.

The remaining part of the dry working gas of supercritical fluid exhausted from the compressor 25 passes through a pipe 45 and is introduced into the pipe 40 coupling the outlet of the turbine 21 and an inlet of the heat exchanger 23. The pipe 45 functions as a bypass pipe. The pipe 45 is provided with a flow rate regulating valve 30 for regulating a flow rate of the dry working gas of supercritical fluid to be introduced into the pipe 40. When the rotation speed of the compressor 25 is constant, in order to maintain the pressure at the outlet of the compressor 25 constant, the pressure at the inlet of the compressor 25 needs to be constant. Accordingly, the flow rate of the dry working gas to be bypassed is regulated by the flow rate regulating valve 30. Note that the flow rate regulating valve 30 functions as a bypass flow rate regulating valve.

Further, the gas turbine facility 10 has a flow rate detecting unit 50 detecting the flow rate of fuel flowing through the pipe 35, a flow rate detecting unit 51 detecting the flow rate of oxidant flowing through the pipe 36, a flow rate detecting unit 52 detecting the flow rate of dry working gas flowing through the pipe 42, a flow rate detecting unit 53 detecting the flow rate of dry working gas flowing through the pipe 44, and a flow rate detecting unit 54 detecting the flow rate of dry working gas flowing through the pipe 45. Each flow rate detecting unit is constituted of, for example, a flowmeter of venturi type, Coriolis type, or the like.

Here, the flow rate detecting unit 50 functions as a fuel flow rate detecting unit, the flow rate detecting unit 51 as an oxidant flow rate detecting unit, the flow rate detecting unit 52 as a combustor introduction flow rate detecting unit, the flow rate detecting unit 53 as an exhaust flow rate detecting unit, and the flow rate detecting unit 54 as a bypass flow rate detecting unit.

The gas turbine facility 10 has a control unit 60 which controls openings of the respective flow rate regulating valves 16, 29, 30 based on detection signals from the respective flow rate detecting units 50, 51, 52, 53, 54. This control unit 60 mainly has, for example, an arithmetic unit (CPU), a storage unit such as a read only memory (ROM) and a random access memory (RAM), an input/output unit, and so on. The CPU executes various types of arithmetic processing using, for example, programs, data, and the like stored in the storage unit.

The input/output unit inputs an electrical signal from an outside device or outputs an electrical signal to an outside device. Specifically, the input/output unit is connected to, for example, the respective flow rate detecting units 50, 51, 52, 53, 54 and the respective flow rate regulating valves 15, 16, 29, 30, and so on in a manner capable of inputting/outputting various signals. Processing executed by this control unit 60 is realized by, for example, a computer apparatus or the like.

Next, operations related to flow rate regulation of fuel, oxygen, and dry working gas (carbon dioxide) supplied to the combustor 20 will be described with reference to FIG. 1.

While the gas turbine facility 10 is operated, an output signal from the flow rate detecting unit 50 is inputted to the control unit 60 via the input/output unit. Based on the inputted output signal, the oxygen flow rate needed for making the equivalence ratio be 1 is calculated in the arithmetic unit by using programs, data, and so on stored in the storage unit. Note that the fuel flow rate is controlled by regulating an opening of the flow rate regulating valve 15 based on, for example, a required gas turbine output.

Subsequently, based on an output signal from the flow rate detecting unit 51 which is inputted from the input/output unit, the control unit 60 outputs an output signal for regulating the valve opening from the input/output unit to the flow rate regulating valve 16 so that the calculated carbon dioxide flow rate flows through the pipe 36.

Next, in the arithmetic unit of the control unit 60, based on an output signal from the flow rate detecting unit 50 which is inputted from the input/output unit, the flow rate of dry working gas (carbon dioxide) of supercritical fluid introduced into the combustor 20, the flow rate of the dry working gas of supercritical fluid exhausted from the pipe 44, and the flow rate of the dry working gas of supercritical fluid bypassing via the pipe 45 are calculated. Note that calculations of these flow rates can be performed simultaneously as the above-described calculation of the oxygen flow rate. Further, the flow rate of the dry working gas can also be calculated based on an output signal from the flow rate detecting unit 51.

Here, the flow rate of the dry working gas (carbon dioxide) introduced into the combustor 20 is calculated so that the combustor jetting velocity V becomes a set value. Note that the flow rate of the dry working gas exhausted from the pipe 44 is, as described above, the amount equivalent to the amount of carbon dioxide generated by combusting fuel and oxygen in the combustor 20. For example, when the fuel flow rate decreases, the flow rate of the dry working gas bypassed via the pipe 45 increases. On the other hand, when the fuel flow rate increases, the flow rate of the dry working gas bypassed via the pipe 45 decreases.

Note that the compressor 25 is coupled coaxially to the turbine 21. Thus, when the turbine 21 is at a rated value, the compressor 25 rotates constantly at a rated rotation speed of the turbine 21. Further, the pressure at the inlet of the compressor 25 is constant, and the pressure of the dry working gas at the outlet of the compressor 25 is a constant supercritical pressure. Thus, the flow rate of the dry working gas exhausted from the compressor 25 becomes constant.

Subsequently, based on output signals from the flow rate detecting units 52, 53, 54 inputted from the input/output unit, the control unit 60 outputs output signals for regulating the valve openings from the input/output unit to the flow rate regulating valves 29, 30 so that the respective calculated flow rates of the dry working gas flow through the pipes 42, 44, 45. Note that in the structure illustrated in FIG. 1, those detected in the flow rate detecting unit 52 are flow rates of the dry working gas introduced into the combustor 20 and the dry working gas exhausted from the pipe 44.

Here, the pump 27 is controlled by the control unit 60 to be at a rotation speed by which the flow rates of the dry working gas introduced into the combustor 20 and the dry working gas exhausted from the pipe 44 can be drawn in. Further, the pressure of the dry working gas at an outlet of the pump 27 is a pressure required at an inlet of the combustor 20, in other words, the inlet of the turbine 21.

Here, for example, when the flow rate of the dry working gas introduced into the combustor 20 is decreased, the control unit 60 controls the flow rate regulating valve 30 for example.

Then, the dry working gas flowing through the pipe 42 after it is branched to the pipe 44 passes through the heat exchanger 23 and introduced into the combustor 20.

By performing the controls as described above, even when the turbine load changes, the combustor jetting velocity V can be maintained almost constant in the appropriate range. Thus, the recirculation zone is formed in the appropriate range of the combustion zone, and flame stabilization in the combustor 20 can be achieved.

Figure 2:
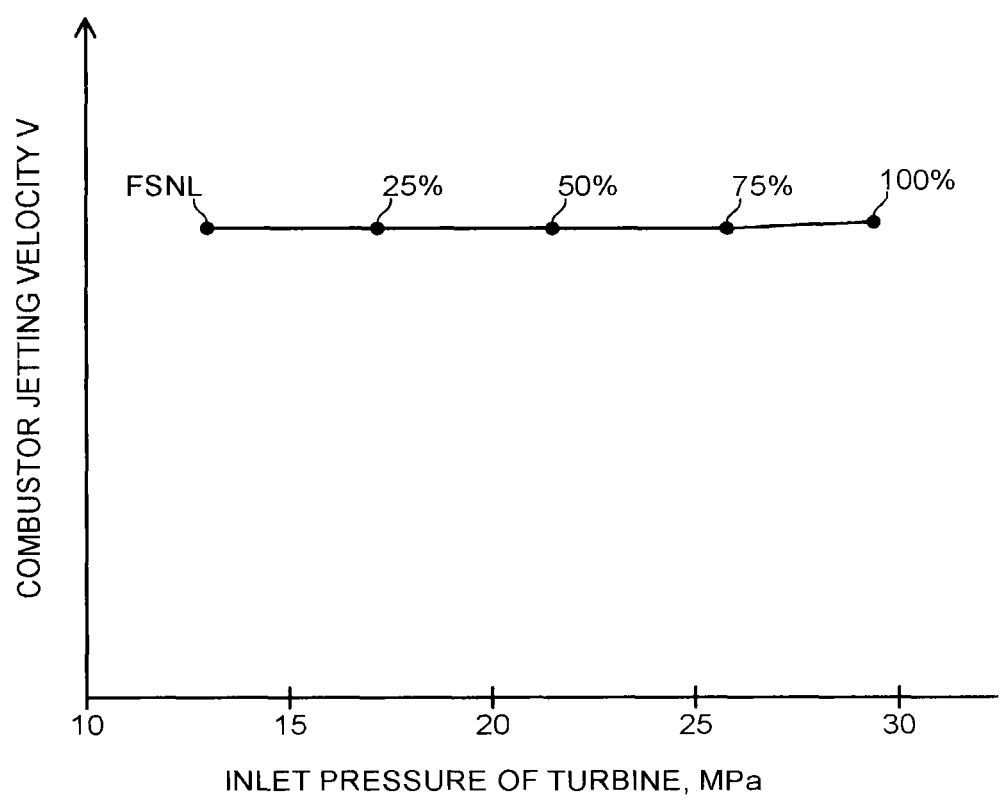
FIG. 2 is a diagram illustrating the relation between an inlet pressure of a turbine and a combustor jetting velocity V in each load state in the gas turbine facility of the embodiment.
Figure 3:
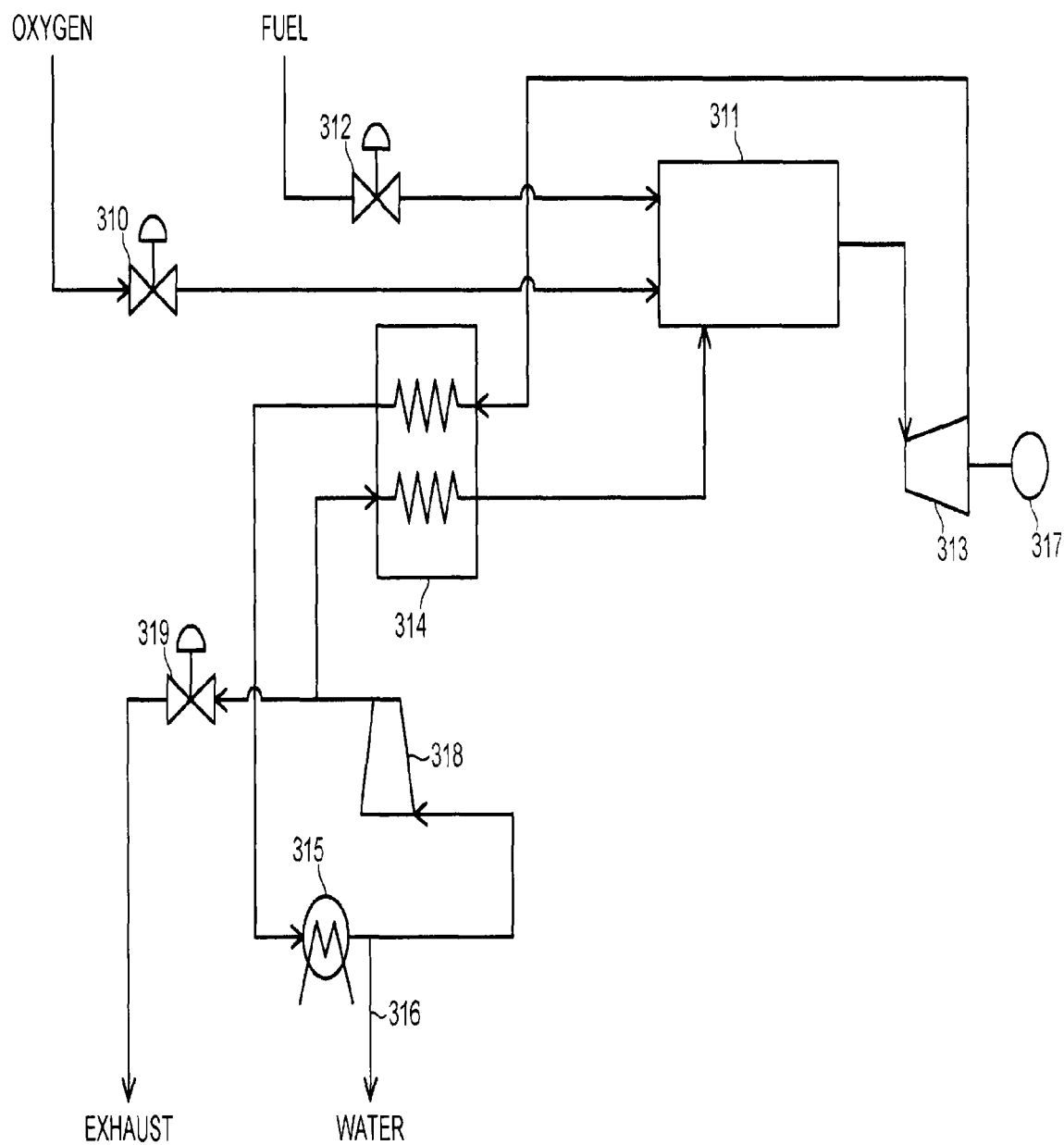
FIG. 3 is a system diagram of a conventional gas turbine facility in which a part of carbon dioxide generated in a combustor is circulated as working fluid.

Here, FIG. 2 is a diagram illustrating the relation between an inlet pressure of the turbine 21 and the combustor jetting velocity V in each load state in the gas turbine facility 10 of the embodiment. Note that the outlet pressure of the turbine 21 in the illustration is 3 MPa. Further, in FIG. 2, for example, FSNL is a full speed no load state, and 25% indicates that the turbine load is 25%.

As illustrated in FIG. 2, even when the turbine load changes, the combustor jetting velocity V is maintained almost constant.

As described above, in the gas turbine facility 10 of the embodiment, the pressure of the dry working gas at the outlet of the compressor 25 is a constant supercritical pressure. Then, the pump 27 is provided in the pipe 42, and the pipe 45 bypassing a part of the dry working gas to the pipe 40 is provided. Even when the turbine load changes by them, they enable to maintain the combustor jetting velocity V substantially constant in the appropriate range and achieve flame stabilization in the combustor 20.

In the above-described embodiment, even when the turbine load changes, the combustor jetting velocity can be maintained in the appropriate range, and flame stabilization can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gas turbine facility, comprising: a combustor combusting fuel and oxidant; a turbine rotated by combustion gas exhausted from the combustor; a heat exchanger cooling the combustion gas exhausted from the turbine; a water vapor remover removing water vapor from the combustion gas which passed through the heat exchanger to regenerate dry working gas therefrom; a compressor compressing the dry working gas until it becomes supercritical fluid; a combustor introduction pipe guiding a part of the supercritical fluid exhausted from the compressor to the combustor via the heat exchanger; an exhaust pipe branched from the combustor introduction pipe on an upstream side of the heat exchanger to exhaust a part of the dry working gas flowing through the combustor introduction pipe to the outside; and a bypass pipe introducing a remaining part of the supercritical fluid exhausted from the compressor into a pipe extending from an outlet of the turbine to an inlet of the heat exchanger.

2. The gas turbine facility according to claim 1, wherein the compressor comprises a centrifugal compressor and is coupled coaxially to the turbine.

3. The gas turbine facility according to claim 1, further comprising a cooler interposed in the combustor introduction pipe on an upstream side of a branch part of the exhaust pipe to cool the supercritical fluid flowing through the combustor introduction pipe.

4. The gas turbine facility according to claim 3, further comprising
   a pump interposed in the combustor introduction pipe between a branch part of the exhaust pipe and the cooler to increase pressure of the dry working gas flowing through the combustor introduction pipe according to a turbine load.

5. The gas turbine facility according to claim 4,
   wherein the pump is controlled in rotation speed.

6. The gas turbine facility according to claim 1,
   wherein a jetting velocity to the combustor of the dry working gas guided into the combustor via the combustor introduction pipe is maintained constant.

7. The gas turbine facility according to claim 1,
   wherein the dry working gas is carbon dioxide.

8. The gas turbine facility according to claim 1, further comprising: a fuel flow rate detecting unit interposed in a first pipe, which the fuel supplied to the combustor flows through, to detect a flow rate of the fuel; an oxidant flow rate detecting unit interposed in a second pipe, which the oxidant supplied to the combustor flows through, to detect a flow rate of the oxidant; an oxidant flow rate regulating valve provided in the second pipe, which the oxidant flows through, to regulate the flow rate of the oxidant; a combustor introduction flow rate detecting unit interposed in the combustor introduction pipe to detect a flow rate of the supercritical fluid flowing through the combustor introduction pipe; an exhaust flow rate detecting unit interposed in the exhaust pipe to detect a flow rate of the supercritical fluid flowing through the exhaust pipe; an exhaust flow rate regulating valve provided in the exhaust pipe to regulate the flow rate of the supercritical fluid flowing through the exhaust pipe; a bypass flow rate detecting unit interposed in the bypass pipe to detect a flow rate of the supercritical fluid flowing through the bypass pipe; a bypass flow rate regulating valve provided in the bypass pipe to regulate the flow rate of the supercritical fluid flowing through the bypass pipe; and a control unit controlling openings of the oxidant flow rate regulating valve, the exhaust flow rate regulating valve, and the bypass flow rate regulating valve based on detection signals from the fuel flow rate detecting unit, the oxidant flow rate detecting unit, the combustor introduction flow rate detecting unit, the exhaust flow rate detecting unit, and the bypass flow rate detecting unit.

\* \* \* \* \*